US012761793B2

(12) United States Patent
Fu et al.

(10) Patent No.: US 12,761,793 B2
(45) Date of Patent: Oct. 13, 2026

(54) MEMORY SYSTEMS AND OPERATING METHODS THEREOF AND MEMORY CONTROLLERS

(71) Applicant: Yangtze Memory Technologies Co., Ltd., Wuhan (CN)

(72) Inventors: Hai Fu, Wuhan (CN); Guiyuan Duan, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/605,527

(22) Filed: Mar. 14, 2024

(65) Prior Publication Data

US 2025/0165146 A1 May 22, 2025

(30) Foreign Application Priority Data

Nov. 22, 2023 (CN) ......................... 202311573896.8

(51) Int. Cl.
*G06F 3/06* (2006.01)
*G06F 11/1446* (2026.01)

(52) U.S. Cl.
CPC ............ *G06F 3/061* (2013.01); *G06F 3/0634* (2013.01); *G06F 3/0679* (2013.01); *G06F 11/1469* (2013.01); *G06F 2201/84* (2013.01)

(58) Field of Classification Search
CPC ...... G06F 3/061; G06F 3/0634; G06F 3/0679; G06F 11/1469; G06F 2201/84
See application file for complete search history.

(56) References Cited

U.S. PATENT DOCUMENTS 11,698,751 B2 * 7/2023 Agarwal ............... G06F 3/0656 711/154
2016/0062690 A1 * 3/2016 Shin ...................... G06F 1/3287 711/103
2020/0327063 A1 * 10/2020 Kang .................. G06F 12/0871
2023/0112869 A1 * 4/2023 Hwang ................. G06F 3/0679 711/154
2023/0142174 A1 * 5/2023 Lee ....................... G06F 3/0679 711/154
2023/0350803 A1 * 11/2023 Jin ........................ G06F 3/0619
2024/0069810 A1 * 2/2024 Shin ........................ G06F 12/04

* cited by examiner

*Primary Examiner* — Hosain T Alam
*Assistant Examiner* — Subir Kumar Chowdhury
(74) *Attorney, Agent, or Firm* — Hanley, Flight & Zimmerman, LLC

(57) ABSTRACT

An example memory system is provided and includes a memory device and a memory controller. The memory controller includes a buffer and supports a host performance boost mode. The memory controller is configured to: back up the data related to the host performance boost mode in the first memory area of the buffer to a second memory area, in response to the memory controller entering the power-saving mode; the first memory area is in a power-down state when the memory controller being in the power-saving mode, and the second memory area is able to retain the data stored in the second memory area when the memory controller is in the power-saving mode; restore the data related to the host performance boost mode in the second memory area to the first memory area, in response to exiting the power-saving mode.

20 Claims, 11 Drawing Sheets

MEMORY SYSTEMS AND OPERATING METHODS THEREOF AND MEMORY CONTROLLERS

CROSS-REFERENCE TO RELATED APPLICATIONS

The present application claims the benefit of priority to China Application No. 202311573896.8, filed on Nov. 22, 2023, the content of which is incorporated herein by reference in its entirety.

TECHNICAL FIELD

The present disclosure relates to the technical field of semiconductors, such as memory systems and operating methods thereof, memory controllers and computer readable storage media.

BACKGROUND

With the high-speed development of data storage technology, more and more data memory systems appear in electronic devices used by people, such as solid state drives (SSD) and so on. SSD has been widely used in many fields such as military, vehicle-mounted, industrial, medical and aviation, because of its fast reading and writing speed, anti-vibration, low power consumption, no noise, low heat and light weight.

DETAILED DESCRIPTION

Figure 1:
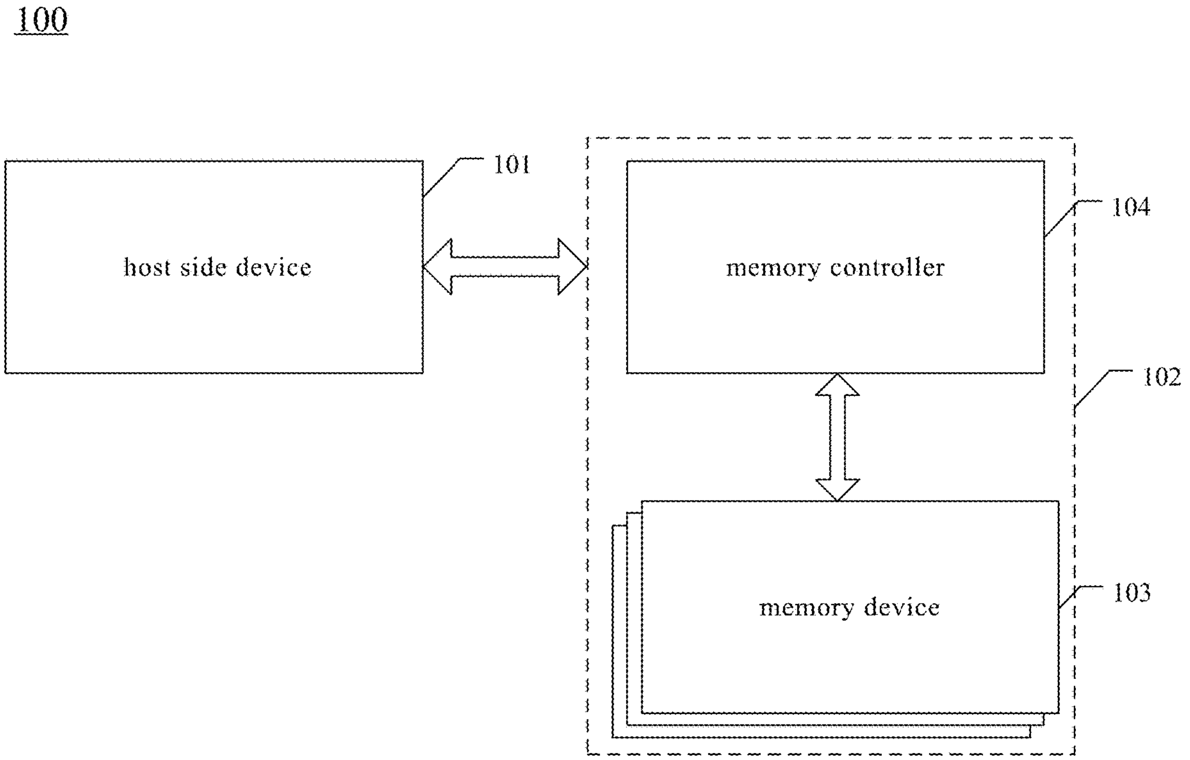
FIG. 1 is a schematic diagram of an example system with a memory system provided by an example of the present disclosure.

Example implementations of the present disclosure may be described in more detail below with reference to the accompanying drawings. Although example implementations of the present disclosure are shown in the drawings, it should be understood that the present disclosure may be implemented in various forms and should not be limited by the implementations set forth herein. Rather, these implementations are provided to enable a more thorough understanding of the disclosure and to fully convey the scope of the disclosure to those skilled in the art.

A great deal of details is given in the following description to provide a more thorough understanding of the disclosure. However, it may be apparent to those skilled in the art that the present disclosure may be practiced without one or more of these details. Some technical features well known in the art are not described in other examples to avoid confusion with the present disclosure. That is, not all the features of the actual implementations are described herein, and the well-known functions and structures are not described in detail.

In the accompanying drawings, the same reference number may denote the identical elements throughout the drawings.

It should be appreciated that the spatial relationship terms such as "under", "below", "the below", "down", "on", "the above", etc. may be used herein for ease of description, and thereby used to describe the relationship of one element or feature shown in the drawings with other elements or features. It should be appreciated that, in addition to the orientations shown in the drawings, the spatial relationship terms may be intended to include different orientations of the device in use and operation. For example, if the device in the accompanying drawings is turned over, then the element or feature described as "under" or "below" other elements may be oriented to be "on" the other elements or features. Thus, the example terms "under" and "below" may include both up and down orientations. The device may be oriented in other ways (rotated 90 degrees or in other orientations) and the spatial description terms used herein are interpreted accordingly.

The terms used herein is for the purpose of describing examples only and is not a limitation of the present disclosure. When used herein, the singular forms "a", "an", and "the/that" may also be intended to include the plural forms, unless the context clearly indicates otherwise. It should be appreciated that, the terms "comprising" and/or "including", when used in this specification, may identify the presence of the features, integers, operations, operations, components and/or parts, but do not exclude the presence of one or more other features, integers, operations, operations, components, and/or parts and/or components and/or groups. When used herein, the term "and/or" may include any and all combinations of the relevant listed items.

The memory system in implementations of the present disclosure include, but are not limited to, a memory system including three-dimensional NAND type memory, which is taken as an example to illustrate the memory system provided by this application for ease of understanding.

FIG. 1 illustrates a schematic diagram of an example system with a memory device provided by the implementations of the present disclosure. In the implementations, the System 100 may be a mobile phone, desktop computer, laptop computer, tablet computer, vehicle computer, game console, printer, positioning device, wearable electronic device, smart sensor, virtual reality (VR) device, augmented reality (AR) device or any other electronic device having memory therein. As shown in FIG. 1, the system 100 may include a host side device 101 and a memory system 102. The memory system 102 may comprise one or more memory devices 103 and a memory controllers 104. The host side device 101 may include a processor of an electronic device (e.g. the central processing unit (CPU)) or a system-on-chip (SoC) (e.g. an application processor (AP)). The host side device 101 may be configured to send data to or receive data from memory system 102.

In some implementations, the memory controller 104 is coupled to the memory device 103 and host side device 101 and is configured to control the memory device 103. The memory controller 104 may manage data stored in the memory device 103 and communicate with the host side device 101. In some implementations, the memory controller 104 is designed to operate in low duty cycles, such as a secure digital card, compact flash card (CFC), universal serial bus (USB) flash drive or other media for use in electronic devices such as personal calculators, digital cameras, mobile phones, and the like. In some implementations, the memory controller 104 is designed to operate in a high duty cycle environment, such as solid state disk or embedded multi-media card (eMMC).

In some implementations, the memory controller 104 and one or more memory devices 103 may be integrated into various types of memory devices. That is, the memory system 102 may be implemented and encapsulated in different types of terminal electronics.

Figure 2:
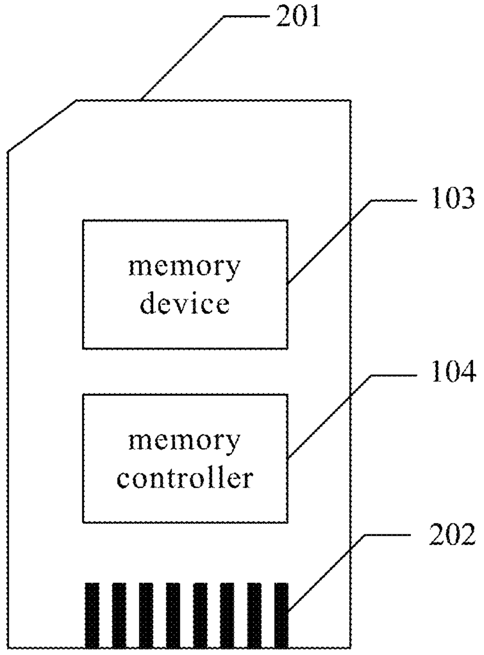
FIG. 2 is a schematic diagram of an example memory card with a memory system provided by an example of the present disclosure.
Figure 3:
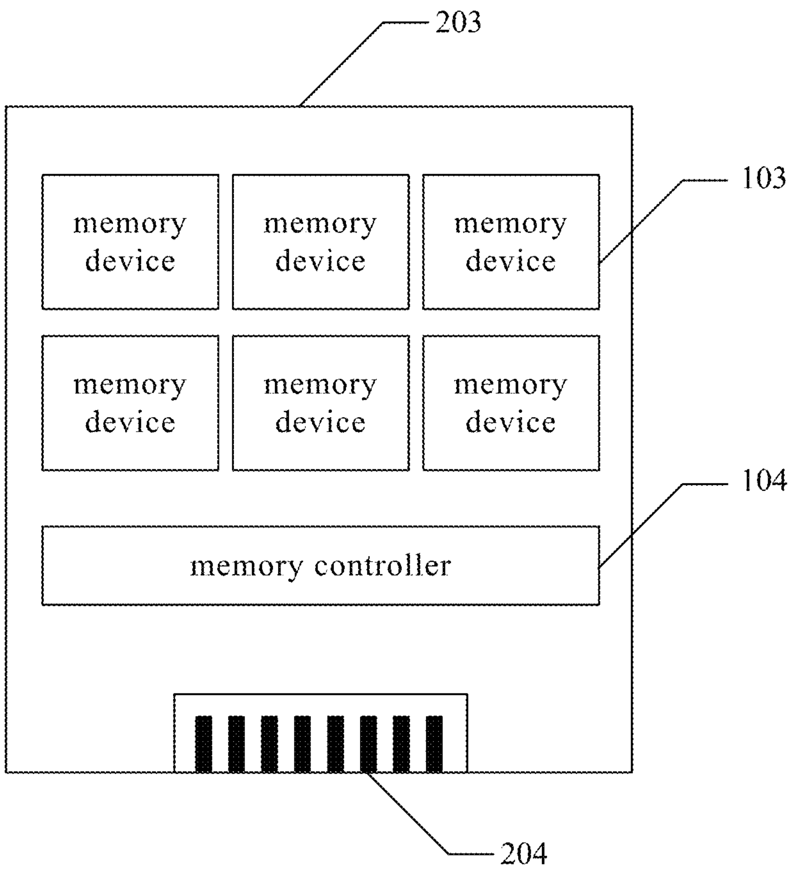
FIG. 3 is a schematic diagram of an example solid-state disk with a memory system provided by an example of the present disclosure.

In an example as shown in FIG. 2, the memory controller 104 and a single memory device 103 may be integrated into the memory card 201L The memory card 201 may be one of a compact flash memory card, a smart media card (SMC), a memory stick (MS), a multi-media card (MMC), for example, RS-MMC, MMCmicro, eMMC and so on, a secure digital card, such as mini SD card, micro SD card, SDHC card and the like, universal flash card. The memory card 201 may also include a memory card connector 202 that couples the memory card 201 to a host side device (e.g., host side device 101 in FIG. 1). In another example as shown in FIG. 3, the memory controller 104 and a plurality of memory devices 103 may be integrated into the SSD 203. The SSD 203 may also include an SSD connector 204 that couples the SSD 203 to a host side device (e.g. host side device 101 in FIG. 1). In some implementations, the storage capacity and/or operating speed of the SSD 2063 is greater than those of the memory card 201.

Figure 4:
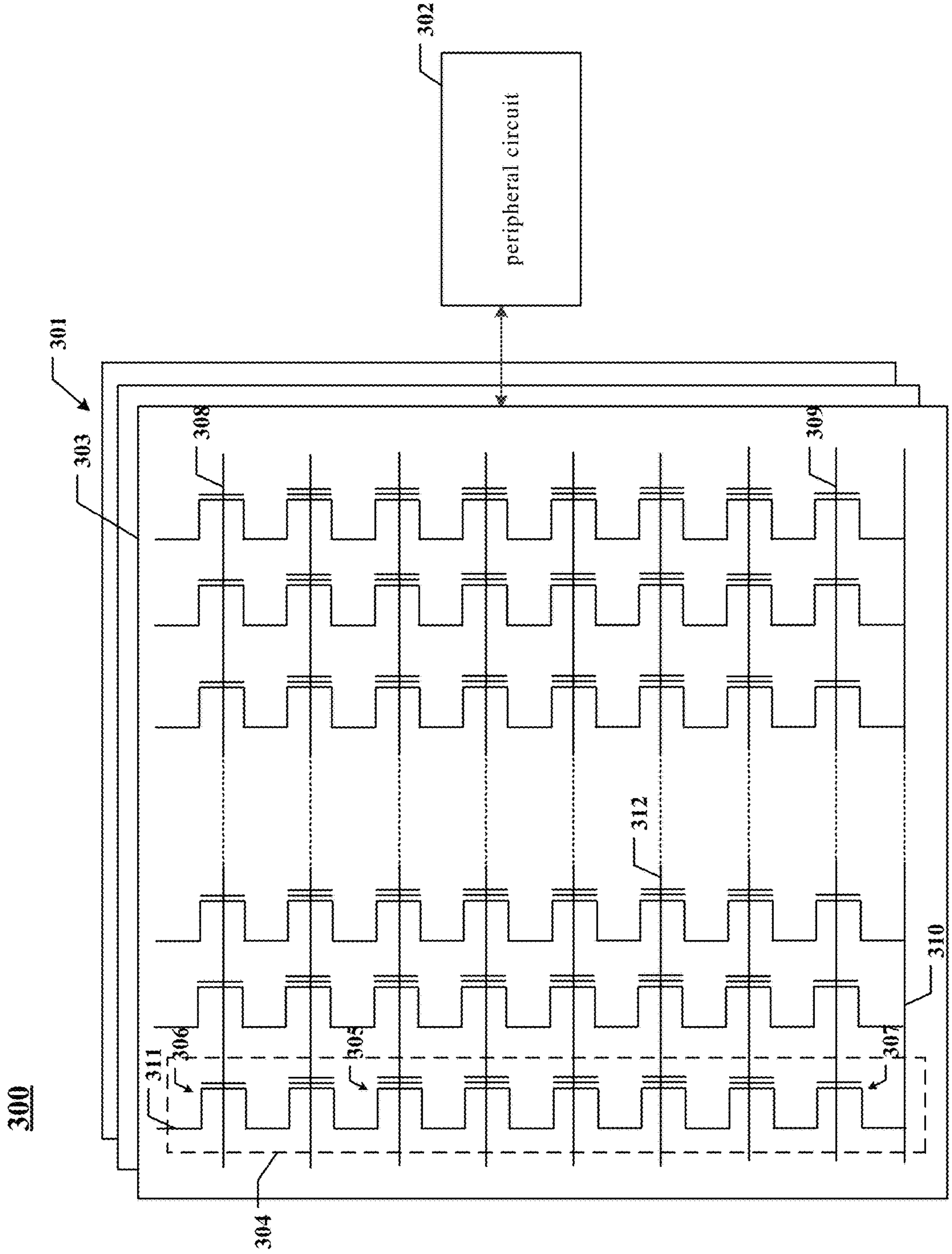
FIG. 4 is a schematic diagram of an example memory device including a peripheral circuit provided by an example of the present disclosure.

FIG. 4 shows a schematic circuit diagram of an example memory device 300 including a peripheral circuit provided by implementations of the present disclosure. The memory device 300 may be an example of memory device 103 in FIG. 1. The memory device 300 may include a memory cell array 301 and a peripheral circuit 302 coupled to the memory cell array 301. The memory cell array 301 may be illustrated as example of a 3D NAND type memory array, in which memory cells 305 are NAND memory cells and provided in the form of an array of memory strings 304, each extending vertically above a substrate (not shown). In some implementations, each memory string 304 includes multiple memory cells 305 coupled in series and stacked vertically. Each memory cell 305 may hold a continuous analog value, e.g., a voltage or charge, which depends on the number of electrons trapped within an area of the memory cell 305. Each memory cell 305 may be a floating gate type memory cell including a floating gate transistor or a charge trapping type memory cell including a charge trapping transistor.

In some implementations, each memory cell 305 may be a single level cell (SLC) having two possible memory states and therefore capable of storing one bit of data. For example, a first memory state "0" may correspond to a first voltage range, and a second memory state "1" may correspond to a second voltage range. In some implementations, each memory cell 305 may be a multi-level cells storing more than single bit of data in more than four memory states, for example, multi-level cell (MLC) storing two bits per cell, triple-level cell (TLC) storing three bits per cell, or quad-level cell (QLC) storing four bits per cell.

As shown in FIG. 4, each memory string 304 may include a bottom select transistor (BST) 307 at its source terminal and a top select transistor (TST) 306 at its drain terminal. The BST 307 and TST 306 may be configured to activate the selected memory string 304 during read and program operations. In some implementations, the sources of the memory strings 304 in the same block 303 are coupled by the common source line (CSL) 310, In another words, all memory strings 304 in the same block 303 may have an array common source (ACS). According to some implementations, TST 306 of each memory string 304 is coupled to a respective bit line (BL) 311, from which data may be read or written via an output bus (not shown). In some implementations, each memory string 304 is configured to be selected or deselected by applying a select voltage (e.g., a voltage higher than the threshold voltage of the TST 306) or a deselect voltage (e.g., 0V) to the respective TST 306 via one or more top select line (TSL) 308 and/or by applying a select voltage (e.g., a voltage higher than the threshold voltage of BST 307) or a deselect voltage (e.g., 0V) to the respective BST 307 via one or more bottom select line (BSL) 309.

As shown in FIG. 4, the memory strings 304 may be organized into a plurality of blocks 303, each of the plurality of blocks 304 has a common source line 310. In some implementations, each block 303 is a basic unit of data for an erase operation, i.e., all memory cells 305 on the same block 303 are erased at the same time. In order to erase the memory cells 305 in the selected block 303, the common source lines 310 of the selected block and unselected blocks on the same plane as the selected block may be biased coupled with an erase voltage. It should be understood that in some examples, the erase operation may be performed at a half block level, at a quarter block level, or at any suitable fraction of a number of blocks or blocks. The memory cells 305 of adjacent memory strings 304 may be coupled by word lines 312, and the word lines 312 select which row of memory cells 305 is affected by read and program operations.

Figure 5:
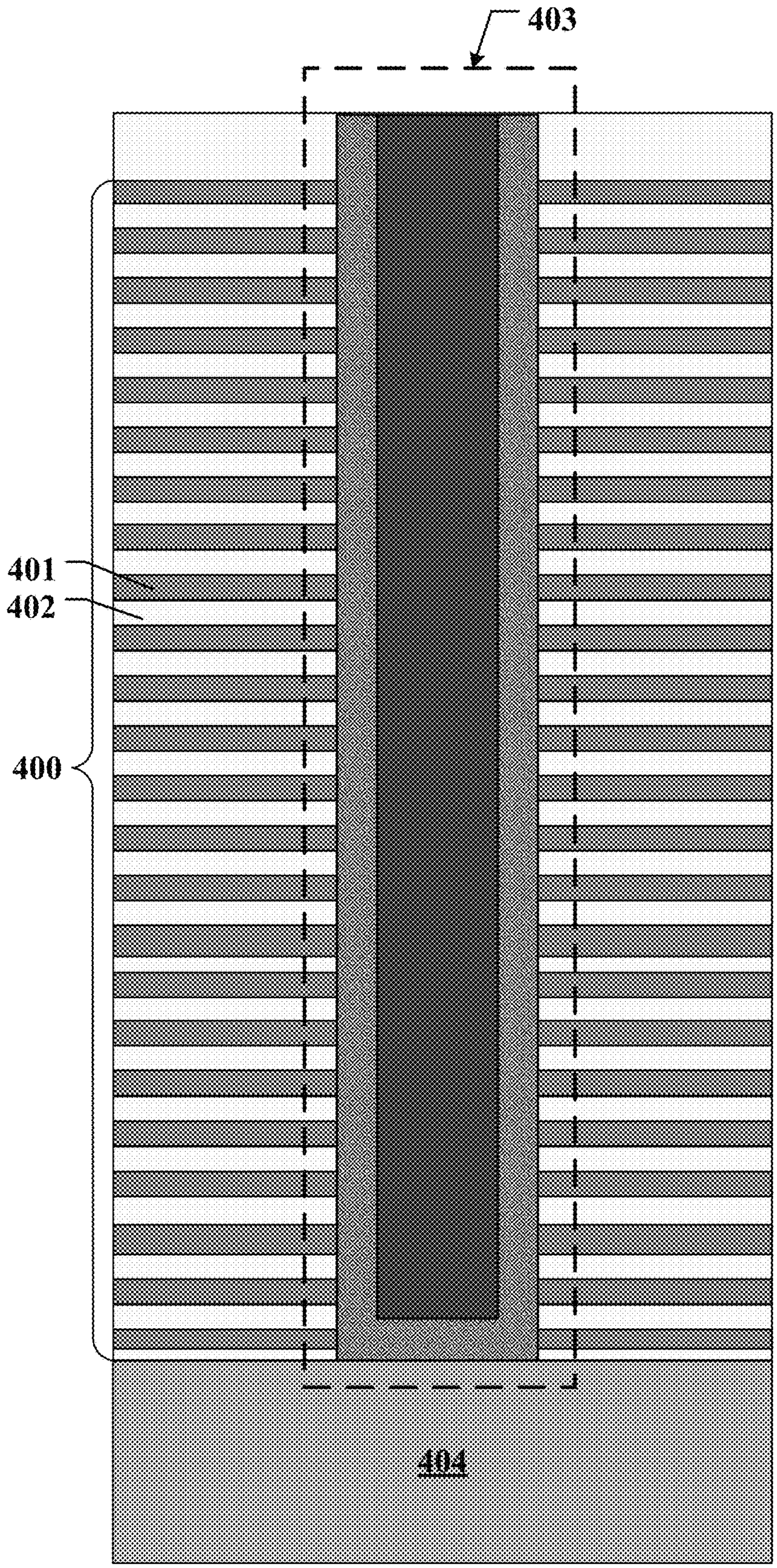
FIG. 5 is a schematic cross-sectional view of a memory array including a memory string provided by an example of the present disclosure.

FIG. 5 shows a schematic cross-sectional view of memory array including a memory string provided by the implementations of the present disclosure. As shown in FIG. 5, the memory array may comprise a stack structure 400, which includes a plurality of gate layers 401 and a plurality of insulating layers 402 alternately stacked in turn and a channel structure 403 perpendicularly penetrating the gate layers 401 and the insulating layers 402. The gate layer 401 and the insulating layer 402 may be alternately stacked. Two adjacent gate layers 401 are separated by an insulating layer 402. The number of memory cells included in the memory array is mainly related to the logarithm of the gate layer 401 and the insulating layer 402 in the stack structure 400.

The constituent material of the gate layer 401 may include a conductive material. The conductive material includes, but not limited to, tungsten (W), cobalt (Co), copper (Cu), aluminum (Al), polysilicon, doped silicon, silicide, or any combination thereof. In some implementations, each gate layer 411 may include a metal layer, for example, a tungsten layer. In some implementations, each gate layer 411 may include a doped polysilicon layer. A plurality of gate layer 401 may surround a channel structure 403 to form a memory string. The gate layer 401 at the top of the stack structure 400 may extend laterally as a top select gate line, and the gate layer 401 at the bottom of the stack structure 400 may extend laterally as a bottom select gate line, and the gate layer 401 extending laterally between the top select gate line and the bottom select gate line may serve as a word line layer.

In some implementations, a stack structure 400 may be disposed on a substrate 404. The substrate 401 may include silicon (e.g. monocrystalline silicon), silicon germanium (SiGe), gallium arsenide (GaAs), germanium (Ge), silicon on insulator (SOI), germanium on insulator (GOI) or any other material.

It should be noted that in other implementations the memory array may include only the stacked structure 400 without substrate. The present disclosure is not limited to whether the memory array includes a substrate or not.

In some implementations, the channel structure 403 includes a functional layer, a channel layer and an insulating fill layer. In some implementations, the channel layer comprises silicon, such as polysilicon. In some implementations, the functional layer is a composite dielectric layer including a tunneling layer, a memory layer (also referred to as a "charge trapping/storage layer") and a barrier layer. The channel structure 403 may have a cylindrical shape (e.g. a pillar shape). According to some implementations, the channel layer, the tunneling layer, the memory layer and the barrier layer are arranged radially from the center of the cylinder toward the outer surface of the cylinder in this order. The tunneling layer may include silicon oxide, silicon oxynitride, or any combination thereof. The memory layer may include silicon nitride, silicon oxynitride or any combination thereof. The barrier layer may comprise a silicon oxide, silicon oxynitride, high dielectric constant (high k) dielectric or any combination thereof. In one example, the function layer may include a composite layer of silicon oxide/silicon oxynitride/silicon oxide (ONO).

Figure 6:
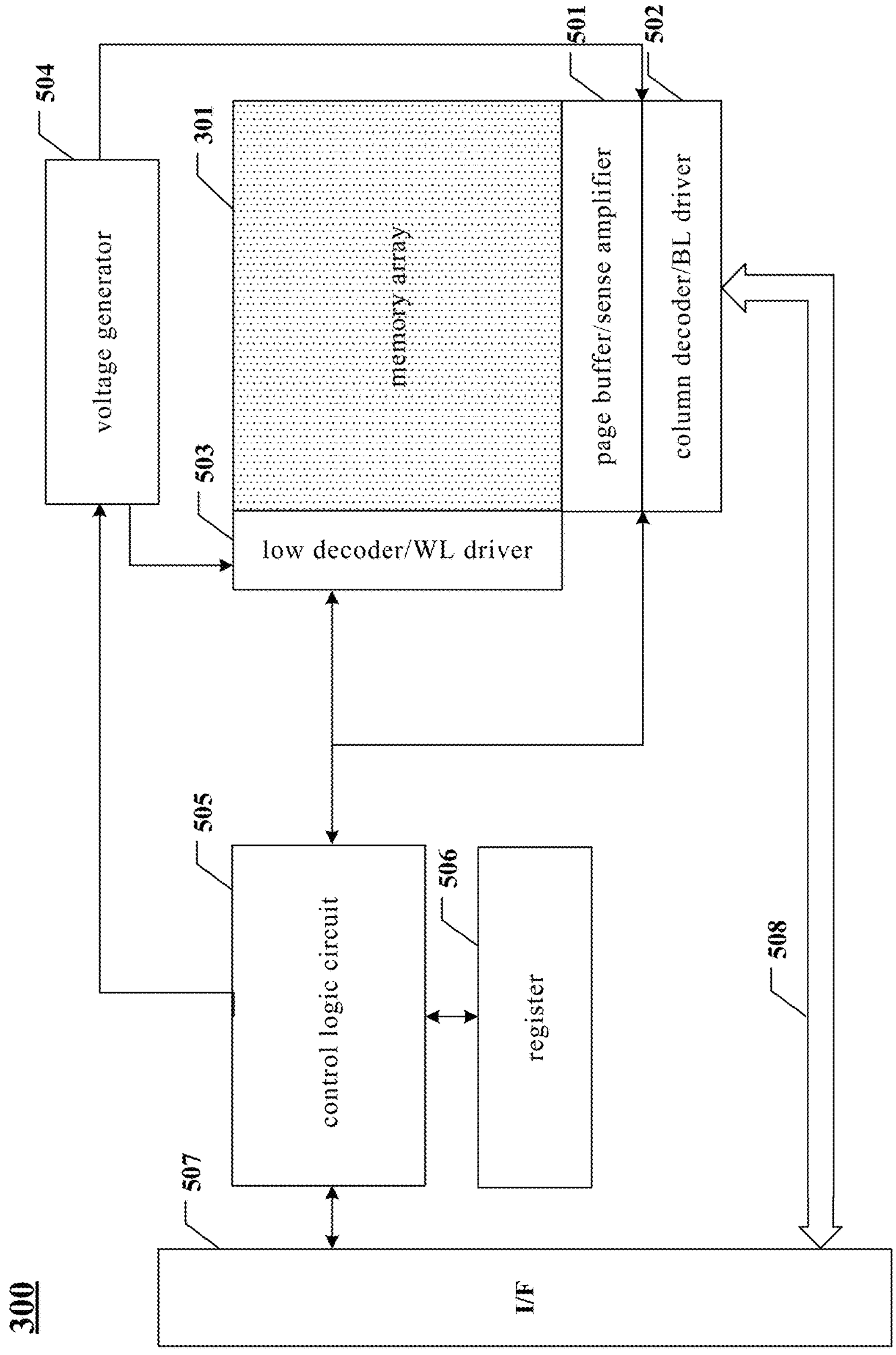
FIG. 6 is a schematic diagram of an example memory device including a memory array and a peripheral circuit provided by an example of the present disclosure.

Referring back to FIG. 4, the peripheral circuit 302 may be coupled to the memory array 301 through the bit lines 311, the word lines 312, the common source lines 310, the BSL 309 and the TSL 308. The peripheral circuit 302 may include any suitable analog, digital, and mixed-signal circuit for facilitating operation of the memory array 301 by applying and sensing voltage and/or current signals to and from each target memory cell 305 via the bit lines 311, the word lines 312, the common source lines 310, the BSL 309, and the TSL 308. The peripheral circuit 302 may include various types of peripheral circuit formed using metal-oxide-semiconductor technology. For example, FIG. 6 shows some example peripheral circuits. The peripheral circuit 302 may include page buffer/sense amplifier 501, column decoder/bit line driver 502, row decoder/word line driver 503, voltage generator 504, control logic circuit 505, register 506, flash interface 507 and data bus 508. It should be understood that, in some examples, additional peripheral circuits not shown in FIG. 6 may also be included.

The page buffer/sense amplifier 501 may be configured to read data from the memory array 301 and program (write) data to the memory array 30/ based on a control signal from the control logic circuit 505, in one example, the page buffer/sense amplifier 501 may store a page of program data (written data) to be programmed into the memory array 301. In another example, the page buffer/sense amplifier 501 may perform a program verify operation to ensure that data has been properly programmed into the memory cells coupled to the selected word lines. In yet another example, the page buffer/sense amplifier 501 may sense low power signals from the bit lines representing data bits stored in memory cells and amplify small voltage swings to recognizable logic levels in a read operation. The column decoder/bit line driver 502 may be configured to be controlled by the control logic circuit 505 and select one or more memory strings by applying a bit line voltage generated from the voltage generator 504.

The row decoder/word line driver 503 may be configured to be controlled by the control logic circuit 505 and to select/deselect a block of the memory array 301 and to select/deselect a word line of the block. The row decoder/word line driver 508 may also be configured to drive the word line using the word line voltage generated from the voltage generator 504. In some implementations, the row decoder/word line driver 503 may also select/deselect and drive the BSL and TSL. As described in detail below, the row decoder/word line driver 503 is configured to perform a program operation on the memory cells coupled to the selected word line(s). The voltage generator 504 may be configured to be controlled by the control logic circuit 505 and generate a word line voltage (e.g., a read voltage, a program voltage, a pass voltage, a local voltage, a verify voltage, etc.), a bit line voltage, and a source line voltage to be supplied to the memory array 301.

The control logic circuit 505 may be coupled to each peripheral circuit described above and configured to control the operation of each peripheral circuit. The register 506 may be coupled to the control logic circuit 505 and include a status register, a command register, and an address register for storing status information, a command operation code (OP code), and a command address for controlling the operation of each peripheral circuit. The flash interface (I/F) 507 may be coupled to the control logic circuit 505 and act as a control buffer to buffer and relay control commands received from a host side device (not shown) to the control logic circuit 505 and to buffer and relay status information received from the control logic circuit 505 to the memory controller. The flash interface 507 may also be coupled to the column decoder/bit line driver 502 via data bus 508 and act as a data I/O interface and data buffer to buffer and relay data to or from the memory array 301.

Figure 7:
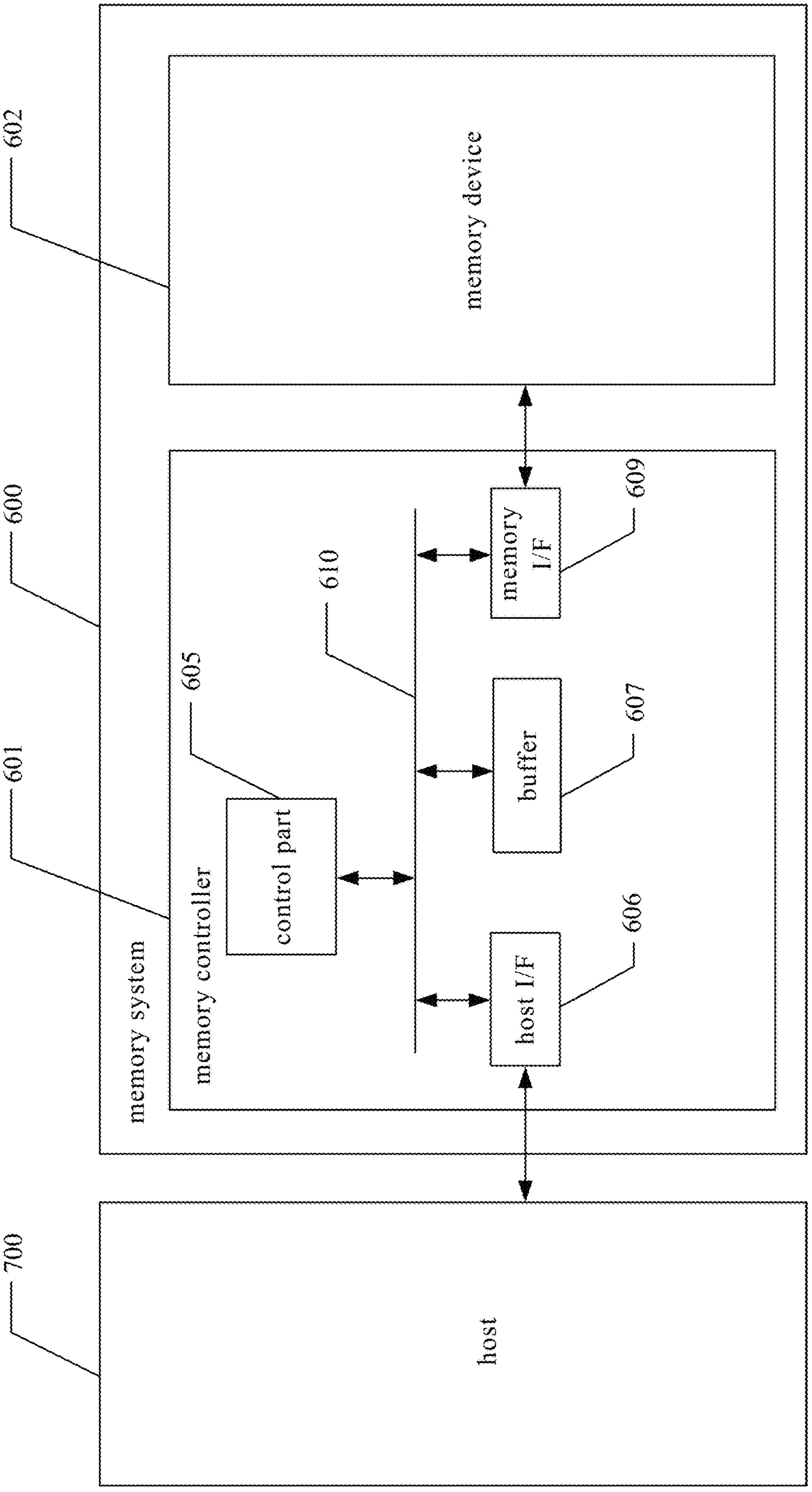
FIG. 7 is a schematic diagram 1 of a system including a host and a memory system provided by an example of the present disclosure.

FIG. 7 is a schematic diagram of a system including a host and a memory system provided by an implementation of the present disclosure. As shown in FIG. 7, the memory system 600 includes a memory controller 601 and a memory device 602, wherein the memory controller 601 is used for controlling the memory device 602 to perform read and write operations. Here, the memory controller 601 and the memory device 602 may be coupled in any way. The memory controller 601 includes a control part 605, a buffer 607, a host I/F interface 606, a memory I/F interface 609 and so on. The memory device 602 may include a three-dimensional NAND type memory as shown in FIGS. 4 to 6.

In some implementations, the host I/F interface 606 outputs commands and valid data (written data) and the like received from the host 700 to the internal bus 610, and transmits the valid data (read data) read from the memory device 602 and response from the control part 605 and the like to the host 700. The memory I/F interface 609 controls a process of writing data or the like to the memory device 602 and a process of reading data or the like from the memory device 602 based on an instruction from the control part 605. The control part 605 controls the memory system 600 as a whole. The control part 605 is, for example, a central processing unit, a micro processor unit (MPU) and the like. The control part 605 receives a command from the host 700 via the host I/F interface 606 and performs control according to the command. For example, the control part 605 instructs the memory I/F interface 609 to write data to the memory device 602 according to the command from the host 700. Further, the control part 605 instructs the memory I/F interface 609 to read data from the memory device 602 in accordance with a command from the host 700.

In some implementations, the memory controller 601 is configured to map the data stored in the memory device 602. In some examples, the memory controller 601 may update and maintain a logical address to physical address (L2P) mapping table, i.e. L2P table. Each L2P entry in the L2P table may represent a mapping relationship between a logical address and a physical address. When the host 700 transmits a read command including a logical address to the memory controller 601, the memory controller 601 may obtain the corresponding physical address based on the L2P table and the logical address in the read command, and may read data from the memory device 602 according to the physical address and send it to the host 700.

In some implementations, the memory controller 601 includes a buffer 607 which may include, but is not limited to, a static random-access memory (SRAM). The memory system 600 further includes a memory for storing L2P tables, such as dynamic random-access Memory (DRAM), The memory controller 601 may quickly fetch the L2P tables from the DRAM so that higher read efficiency may be achieved.

In other implementations, DRAM may not be set as cache space in memory system 600 due to package size, power consumption and cost considerations. In this case, the memory controller 601 is configured to store the L2P table which is a secondary mapping table and occupies a large storage space in the memory device and only stores the primary mapping table which occupies a small storage space in the buffer 607 because of the limited storage space in the memory controller 601. When the memory controller 601 receives a read command packet including a read command and a logical address, the memory controller 601 may obtain the storage location of the L2P table required to be used based on the primary mapping table, and read part of L2P table required to be used from the memory device 602, then obtain a physical address based on the logical address and the read part of L2P table to perform a read operation. That is, two read operations are required to read out the data, resulting in less efficiency of the read operation, for a random read operation. One random read operation may require a large number of L2P tables to be read out from the memory device 602, resulting in less performance of the random read operation.

Figure 8:
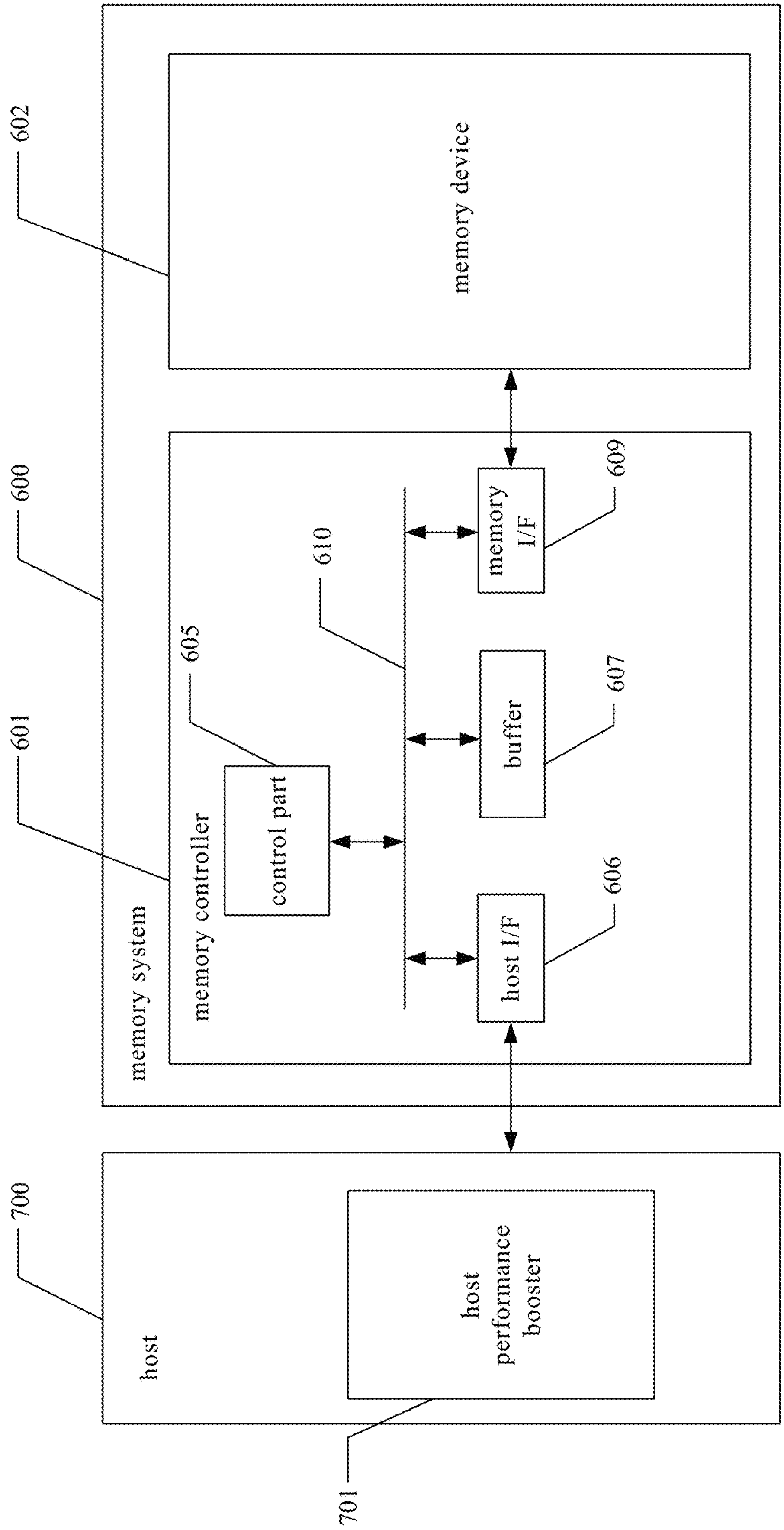
FIG. 8 is a schematic diagram 2 of a system including a host and a memory system provided by an example of the present disclosure.

Continuing with reference to FIG. 8, in some implementations, a system architecture including a host performance booster (HPB) 701 is proposed to address the problem of low efficiency of read operations and poor performance of random read operations in the above-described implementations. In some examples, a portion of the storage space in the host 700 may be divided to include the host performance booster 701 as a buffer space for mapped data. The memory controller 601 may send a portion of the mapped data to the host 700, and the host 700 may buffer the mapped data in the host performance booster 701, wherein the mapped data includes an L2P table. Thus, the host 700 may send an HPB read command packet to the memory system 600 to read the data. The HPB read command packet may include a physical address of the data to be pre-read by the host 700, which the physical address may be obtained according to the mapped data buffered in the host performance booster 701. The memory controller 601 may directly read the data from the memory device 602 according to the physical address in the HPB read command packet without reading the mapped data from the memory device 602, thereby effectively improving the efficiency of the read operation and improving the performance of the random read operation. The data related to the HPB is stored in a buffer in the memory controller. Whether the mapped data buffered in the host performance booster 701 is valid or not may be determined according to the data related to the HPB stored in the buffer.

However, the memory controller may enter/exit a power-saving mode frequently during the runtime. When entering the power-saving mode, most of the data in the buffer may be lost due to power down, including data related to HPB. When exiting the power-saving mode, it may be impossible to determine whether the mapped data in the host performance booster is valid or not due to the loss of the data related to HPB. It may cause the mapped data in the memory device 602 to be re-recommended to the host through the memory controller for a short time, which may affect the performance of the memory controller. In addition, entering/exiting the power-saving mode frequently may also affect the HPB performance and the data read-write speed.

Figure 9:
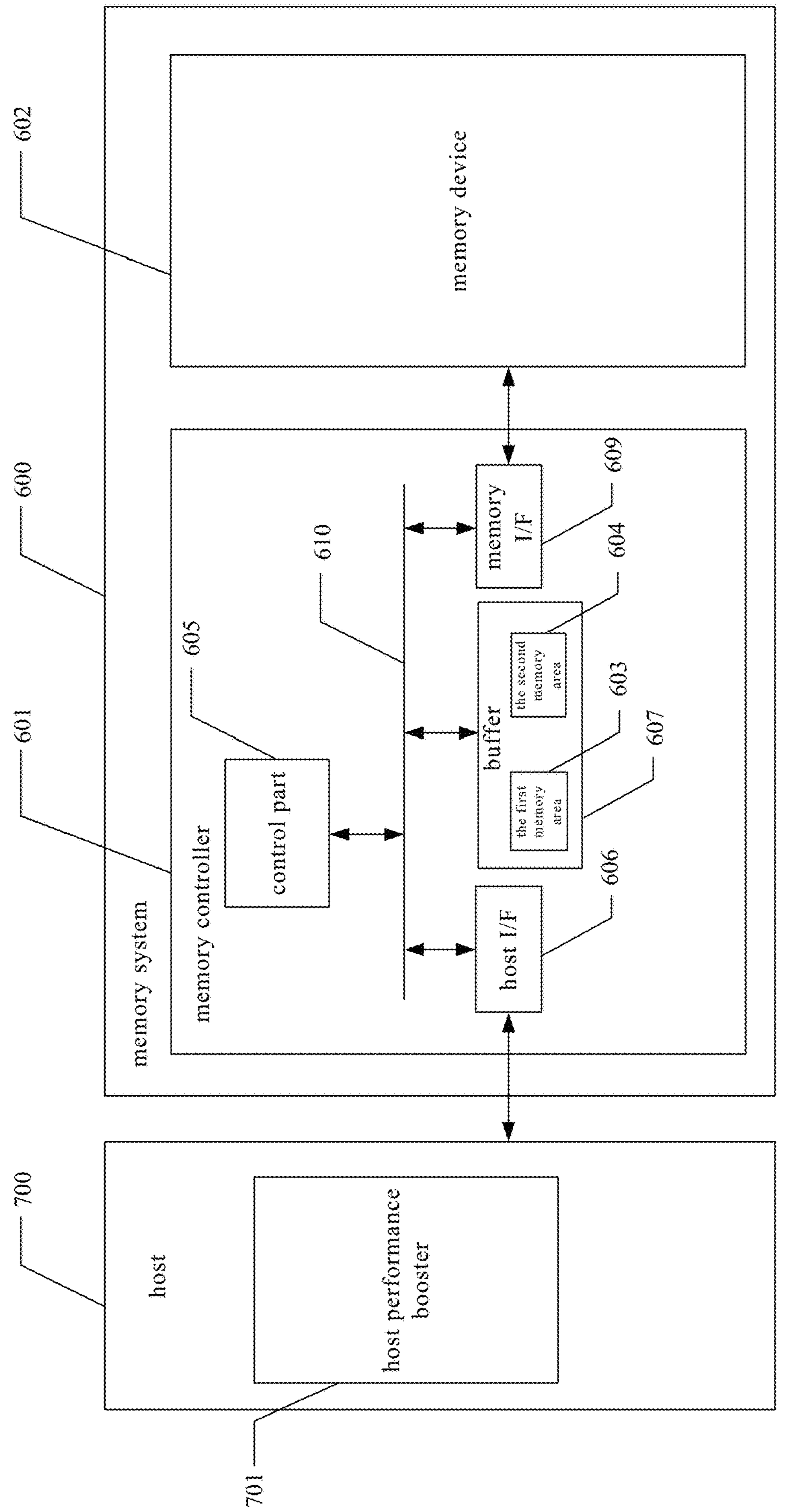
FIG. 9 is a schematic diagram 3 of a system including a host and a memory system provided by an example of the present disclosure.

The present disclosure provides a memory system. As shown in FIG. 9, the memory system 600 comprises a memory device 602 and a memory controller 601 coupled to the memory device 602; the memory controller 601 includes a buffer 607 and supports a host performance boost mode, and the memory controller 601 is configured to: back up the data related to the host performance boost mode in the first memory area 603 of the buffer 607 to a second memory area 604, in response to the memory controller 601 entering the power-saving mode; the first memory area 603 is in a power-down state when the memory controller 601 is in the power-saving mode, and the second memory area 604 is able to retain the data stored in the second memory area 604 when the memory controller 601 is in the power-saving mode; restore the data related to the host performance boost mode in the second memory area 604 to the first memory area 603, in response to exiting the power-saving mode.

In some examples, the memory controller 601 may connect to host 700 including the host performance booster 701. The host performance booster 701 may be a portion of the storage space reserved in the host 700 for buffering the mapped data.

In the implementation of the present disclosure, the mapped data includes a mapping relationship from a logical address to a physical address. The logical address may be a logical block address (LBA), and the physical address may be a physical block address (PBA). The PBA of the data corresponds to the location of the block in the memory device 602 at which the data is located.

In the implementations of the present disclosure, in the HPB system architecture, the logical address space may be divided into multiple HPB areas, each of the HPB areas may be divided into multiple HPB sub-areas, and each of the HPB sub-areas may store multiple L2P entries. The HPB sub-areas that have been buffered in the host performance booster 701 are the activated HPB sub-areas in the memory device 602. The memory device 602 further includes inactivated HPB sub-areas. The mapped data in the HPB sub-areas in the host performance booster 701 corresponds to the mapped data in the activated HPB sub-areas in the memory device 602, and the HPB sub-area in the host performance booster 701 one-to-one corresponds to the activated HPB sub-area in the memory device 602.

In some implementations, the data related to the host performance boost mode comprises a list of areas for the host performance boost mode, a list of sub-areas for the host performance boost mode and a bitmap of dirty units.

The host performance boost area list and host performance boost mode sub-area list here may be considered as the HPB area and HPB sub-area in the memory device 602 being numbered, and the HPB area list corresponding to the HPB area in the memory device 602 and the HPB sub-area list corresponding to the HPB sub-area in the memory device 602 are formed in the buffer 607 of the memory controller 601.

The bitmap of dirty units here is to indicate whether the mapped data in the HPB sub-area in the host performance booster 701 is valid or not. One bit in the bitmap of dirty units corresponds to one HPB sub-area. In some examples, when the mapped data in the HPB sub-area in the memory device 602 is buffered in the host performance booster 701, the memory controller 601 may set each of bits in the bitmap of dirty units of the HPB sub-area in the memory device 602 to 0, which presents that the mapped data in the HPB sub-area in the host performance booster 701 is the same as the mapped data in the corresponding HPB sub-area in the memory device 602, and the mapped data in the host performance booster 701 is valid. In this case, when the host 700 sends the HPB read command packet including the physical address according to the mapped data in the HPB sub-area of the host performance booster 701, the memory controller 601 may directly read data from memory device 602 according to the physical address in the HPB read command packet, i.e., an HPB read operation may be performed.

In some examples, the memory controller 601 may perform background operations, such as garbage collection operations, data migration operations of the SLC buffer, read recycling operations and wear leveling operations without a request from the host 700. Each of the above background operations may change the physical address of the data. After the physical address of the data is changed, the mapping relationship between the logical address and the physical address may also change accordingly. Then the mapped data in the corresponding HPB sub-area in the memory device 602 needs to be updated. The memory controller 601 may set the bit corresponding to the corresponding HPB sub-area to 1 to mark the HPB sub-area as a dirty unit. When the HPB sub-area has been buffered in the host performance booster 701, it represents that the mapped data in the HPB sub-area in the host performance booster 701 is different from the mapped data in the corresponding HPB sub-area in the memory device 602, and the mapped data in the host performance booster 701 is invalid. In this case, when the host 700 sends the HPB read command packet including the mapped data according to the mapped data in the HPB sub-area in the host performance booster 701, if the mapped data in the HPB read command packet belongs to the first HPB sub-area of the host performance boost 701, and the HPB sub-area in the memory device 602 corresponding to the first HPB sub-area is marked as a dirty unit, then the mapped data in the first HPB sub-area is invalid, and the memory controller 601 needs to obtain the mapped data from the HPB sub-area in the memory device 602 corresponding to the first HPB sub-area to get the physical address corresponding to the logical address, and performs a read operation.

In the implementation of present disclosure, the memory controller 601 entering the power-saving mode also may be understood that the memory system 600 enters the power-saving mode, the memory controller 601 is in a state, such as auto power saving, sleep, saving/sleep/deep sleep, etc. Some firmware functions in the memory controller 601 are limited. At this time, only a small portion of areas in the buffer 607 are configured to be in a non-power-down state and are used to hold data, while the data in most other areas in the buffer 607 may be lost due to power down, which may affect the performance of the memory controller 601 and HPB performance and affect the reading and writing speed of data.

In the implementations of present disclosure, data related to the host performance boost mode in the first memory area 603 of the buffer 607 is backed up to the second memory area 604, in response to the memory controller 601 entering the power-saving mode, and the second memory area 604 is able to retain the data stored in the second memory area 604 when the memory controller 601 is in the power-saving mode and restore the backed-up data related to the host performance boost mode to the first memory area 603 when exiting the power-saving mode. In the first aspect, the integrity and continuity of the data related to the host performance boost mode before and after power-saving mode are ensured, thus the stability of the performance of the host performance boost mode is ensured. In the second aspect, since the memory controller 601 does not need to re-recommend sub-areas for the host performance boost to the host performance booster 701 after exiting the power-saving mode, the performance of the memory controller 601 may be improved. In the third aspect, the time to read and write data may be reduced and the performance of data reading and writing may be improved.

Figure 10:
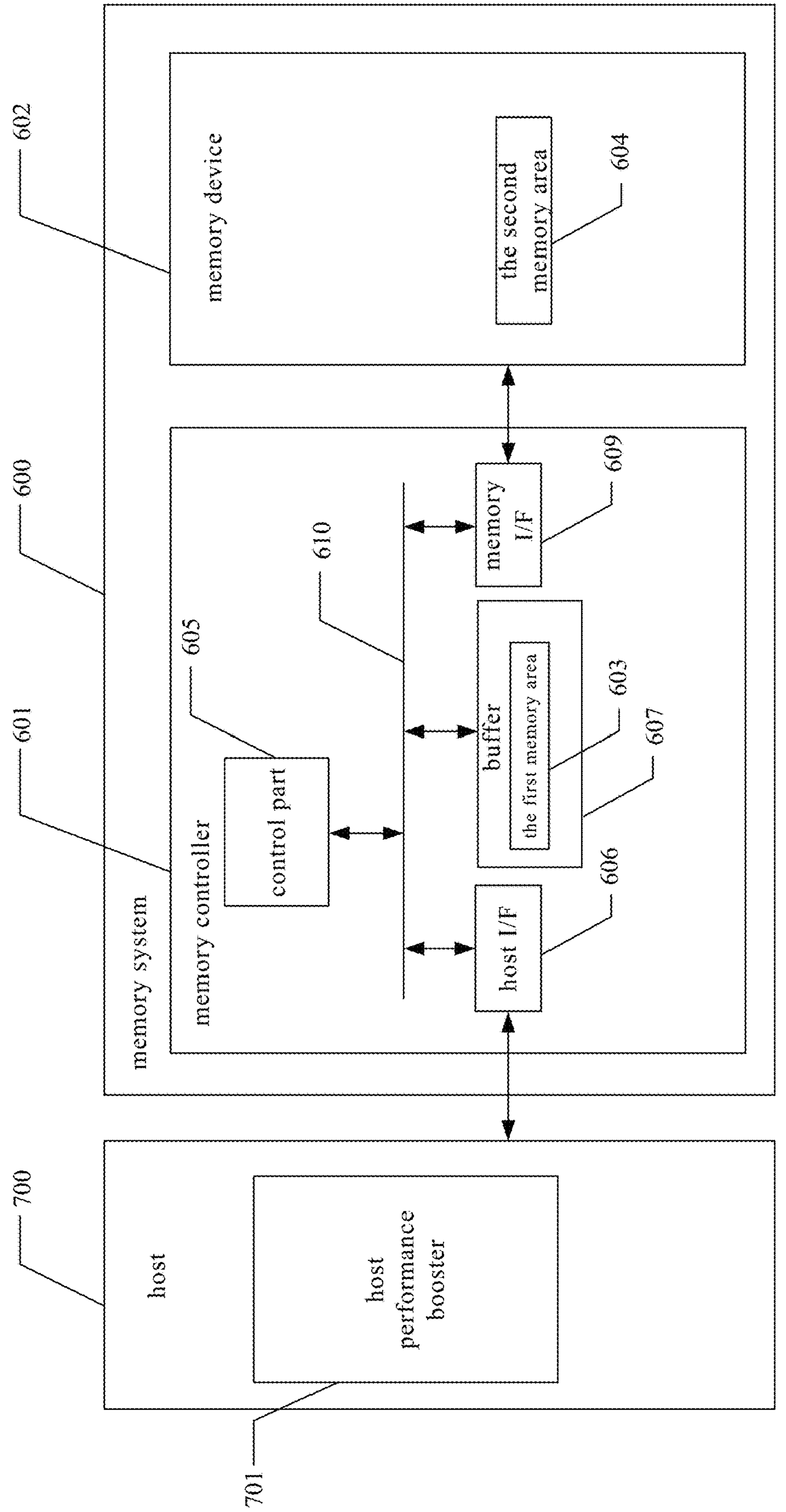
FIG. 10 is a schematic diagram 4 of a system including a host and a memory system provided by an example of the present disclosure.

In some implementations, the second memory area 604 includes an area in the buffer 607 that is in a non-power-down state when the memory controller 601 is in the power-saving mode, as shown in FIG. 9; or the second memory area 604 includes a portion of areas in the memory device 602, as shown in FIG. 10.

It is understood that not all areas of the buffer 607 are in a power-down state while the memory controller 601 is in the power-saving mode, and some areas are not in a power-down state. Therefore, data related to the host performance boost mode in the buffer 607 may be temporarily stored in areas of the buffer 607 that are in a not-power-down state while the memory controller 601 is in the power-saving mode. Alternatively, since the memory device 602 in the implementations of the present disclosure may include a non-volatile memory device 602 that is able to retain data stored therein even in a power-down state, data related to the host performance boost mode in the buffer 607 may be temporarily stored in the memory device 602 while the memory controller 601 is in the power-saving mode.

In some implementations, the memory controller 601 is further configured: back up the data related to the host performance boost mode in the first memory area 603 to an area in the buffer 607 that is in a non-power-down state when the memory controller 601 is in the power-saving mode, in the case that the capacity of the area in the buffer 607 that is in the non-power-down state when the memory controller 601 being in the power-saving mode is greater than or equal to capacity required to store the data related to the host performance boost mode; back up the data related to the host performance boost mode in the first memory area 603 to a portion of areas in the memory device 602, in the case that the capacity of the area in the buffer 607 that is in the non-power-down state when the memory controller 601 being in the power-saving mode is less than the capacity required to store the data related to the host performance boost mode.

In some examples, the data related to the host performance boost mode in the first memory area 603 may be backed up to the memory device 602, in the case that the capacity of the area in the buffer 607 that is in the non-power-down state when the memory controller 601 being in the power-saving mode is greater than or equal to capacity required to store the data related to the host performance boost mode.

The present disclosure provides various examples for backing up data related to host performance boost to buffer 607 or to memory device 602. It may be understood that in the case that the capacity of the area in the buffer 607 that is in the non-power-down state when the memory controller 601 being in the power-saving mode is greater than or equal to capacity required to store the data related to the host performance boost mode, if the data related to the host performance boost mode in the first memory area 603 is backed up to the area that is in non-power-down state in the buffer 607 when the memory controller 601 is in the power-saving mode, then the data related to the host performance boost mode needs to be restored to the position in the buffer 607 before entering power-saving mode after the memory controller 601 exits the power-saving mode. The time for restoring data may be saved because the data is directly transferred from one part of the buffer 607 to another part of the buffer 607, thus the efficiency of data restore may be improved.

In some implementations, the memory controller 601 is configured to: compress the data related to the host performance boost mode in the first memory area 603; store the compressed data related to the host performance boost mode into the second memory area 604.

In the implementations of the present disclosure, the data related to the host performance boost mode in the first memory area 603 is compressed before the data related to the host performance boost mode is backed up to the second memory area 604, so that the memory space to be occupied may be saved.

In some implementations, the memory controller 601 is configured to: generate a data mapping table which includes a mapping relationship between a first address and a second address, wherein the first address is an address of the data related to the host performance boost mode in the first memory area 603 before being backed up to the second memory area 604, and the second address is an address of the data related to the host performance boost mode in the second memory area 604 after being backed up to the second memory area 604.

Here, the first and second address may be logical address or physical address.

In some examples, the processes of compressing and backing up the data related to the host performance boost mode in the first memory area 603 may further include: reading the data related to the host performance boost mode from the first memory area 603; compressing the read data related to the host performance boost mode; writing the compressed data related to the host performance boost mode to a designated location in the second memory area 604 according to the data mapping table.

In some implementations, the memory controller 601 is configured to decompress the compressed data stored in the second memory area 604 related to the host performance boost mode, in response to exiting the power-saving mode; storing the decompressed data related to the host performance boost mode in the first memory area 603.

In some implementations, the data related to the host performance boost mode stored at the second address in the second memory area 604 is acquired, in response to exiting the power-saving mode; the data related to the host performance boost mode in the second memory area 604 is restored to the first address in the first memory area 603 according to the data mapping table.

In some examples, the process of decompressing data related to the host performance boost mode which is backed up to the second memory area 604 and restoring the data to the first memory area 603 in the buffer 607 includes: reading data related to the host performance boost mode previously backed up from the designated address in the second memory area 604 according to the backup situation when entering power-saving mode; decompressing the data related to the host performance boost to restore the original data according to the data compression situation when entering power-saving mode; restoring the decompressed data related to the host performance boost to the specified address space of the first memory area 603 according to the data mapping table.

In some implementations, the memory controller 601 is configured to: enter the power-saving mode after backing up the data related to the host performance boost mode in the first memory area 603 of the buffer 607 to the second memory area 604.

The data related to the host performance boost mode in the first memory area 603 in the implementations of the present disclosure needs to be backed up to the second area before entering power-saving mode, to avoid loss of the data related to the host performance boost mode. In some examples, it is waited for a period of time after the memory controller 601 receives a command requiring power-saving mode, during the period of time, the corresponding backup task may be completed.

In some implementations, the memory system comprises a memory card or solid state disk or general purpose flash memory.

The present disclosure provides a memory controller 601 based on a similar concept to the memory system described above, as shown in FIGS. 8 and 9. The memory controller 601 comprises a buffer 607 and supports a host performance boost mode, and the memory controller 601 is configured to: back up the data related to the host performance boost mode in the first memory area 603 of the buffer 607 to a second memory area 604, in response to the memory controller 601 entering the power-saving mode; the first memory area 603 is in a power-down state when the memory controller 601 is in the power-saving mode, and the second memory area 604 is able to retain the data stored in the second memory area 604 when the memory controller 601 is in the power-saving mode; restore the data related to the host performance boost mode in the second memory area 604 to the first memory area 603, in response to exiting the power-saving mode.

In some implementations, the second memory area 604 includes an area in the buffer 607 that is in a non-power-down state when the memory controller 601 is in the power-saving mode, or a portion of areas in the memory device coupled with the memory controller 601.

Other details regarding the memory controller 601 have been described in detail on the memory system side and may not be repeated here.

Figure 11:
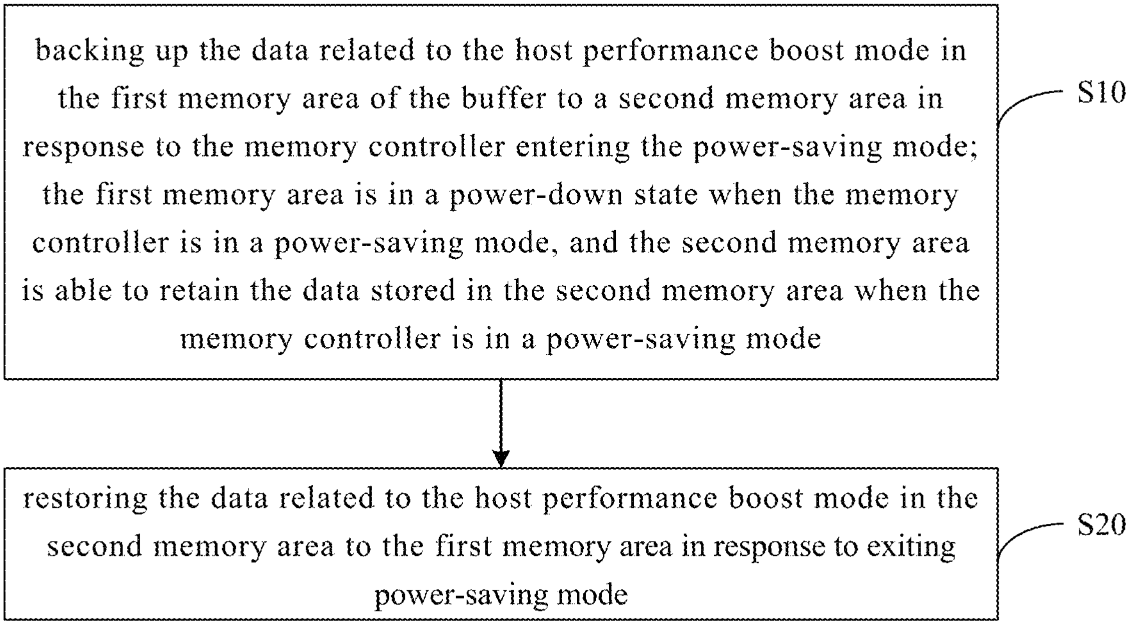
FIG. 11 is a flow diagram of a method for operating a memory system provided by an example of the present disclosure.

The present disclosure provides a method for operating a memory system based on a concept similar to the memory system described above. FIG. 11 is a flow diagram of the operating method provided by the implementations of the present disclosure. As shown in FIG. 11, the method for operating a memory system comprises the following operations: Operation S10: backing up the data related to the host performance boost mode in the first memory area of the buffer in the memory controller to a second memory area, in response to the memory controller being to enter the power-saving mode; wherein the first memory area is in a power-down state when the memory controller being in the power-saving mode, and the second memory area is able to retain the data stored in the second memory area when the memory controller is in the power-saving mode; Operation S20: restoring the data related to the host performance boost mode in the second memory area to the first memory area, in response to exiting the power-saving mode.

In some implementations, the second memory area includes an area in the buffer that is in a non-power-down state when the memory controller being in the power-saving mode, or the second memory area includes a portion of areas in the memory device.

In some implementations, backing up the data related to the host performance boost mode in the first memory area of the buffer in the memory controller to a second memory area comprises: backing up the data related to the host performance boost mode in the first memory area to an area in the buffer that is in a non-power-down state when the memory controller being in the power-saving mode, in the case that the capacity of the area in the buffer that is in the non-power-down state when the memory controller being in the power-saving mode is greater than or equal to capacity required to store the data related to the host performance boost mode; backing up the data related to the host performance boost mode in the first memory area to a portion of areas in the memory device, in the case that the capacity of the area in the buffer that is in the non-power-down state when the memory controller being in the power-saving mode is less than the capacity required to store the data related to the host performance boost mode.

In some implementations, backing up the data related to the host performance boost mode in the first memory area of the buffer in the memory controller to a second memory area further comprises: compressing the data related to the host performance boost mode in the first memory area; storing the compressed data related to the host performance boost mode into the second memory area.

In some implementations, restoring the data related to the host performance boost mode in the second memory area to the first memory area, in response to exiting the power-saving mode comprises: decompressing the compressed data related to the host performance boost mode stored in the second memory area, in response to exiting the power-saving mode; storing the decompressed data related to the host performance boost mode into the first memory area.

In some implementations, restoring the data related to the host performance boost mode in the second memory area to the first memory area, in response to exiting the power-saving mode comprises: generating a data mapping table which includes a mapping relationship between a first address and a second address, wherein the first address is an address of the data related to the host performance boost mode in the first memory area before being backed up to the second memory area, and the second address is an address of the data related to the host performance boost mode in the second memory area after being backed up to the second memory area; acquiring data related to the host performance boost mode stored at the second address in the second memory area, in response to exiting the power-saving mode; restoring the data related to the host performance boost mode in the second memory area to the first address in the first memory area according to the data mapping table.

In some implementations, the operating method further comprises: the memory controller entering the power-saving mode after backing up the data related to the host performance boost mode in the first memory area of the buffer in the memory controller to the second memory area.

In some implementations, the data related to the host performance boost mode comprises a list of areas for the host performance boost mode, a list of sub-areas for the host performance boost mode and a bitmap of dirty units.

The method for operating a memory system in the implementations of the present disclosure may be performed by the memory controller in the memory system in any of the preceding implementations, the technical effects that may be achieved by the memory system in the preceding implementations may also be achieved by the operating method for the memory system, which may not be repeated herein.

The present disclosure further provides a computer-readable storage medium storing computer program. In some implementations, when the computer program is executed by the processor, the operating method of any one of above implementations may be implemented.

All or part of the flow of operating method of the above implementations may be accomplished by hardware associated with computer program instruction. The computer program may be stored in a computer readable storage medium. The execution of the computer program may include the flow of operating method in any of the above implementations. The computer-readable storage medium may be a magnetic disk, a optical disk, a read-only memory (ROM), a random access memory (RAM), a flash memory, a hard disk drive (HDD) or a solid-state hard disk, etc. The computer-readable storage medium may also include a combination of the above-mentioned multiple storage media.

In the first aspect, the implementations of this disclosure provide a memory system comprises a memory device and a memory controller coupled to the memory device; the memory controller includes a buffer and supports a host performance boost mode, and the memory controller is configured to: back up data related to the host performance boost mode in the first memory area of the buffer to a second memory area, in response to the memory controller entering a power-saving mode; the first memory area is in a power-down state when the memory controller being in the power-saving mode, and the second memory area is able to retain the data stored in the second memory area when the memory controller is in the power-saving mode; restore the data related to the host performance boost mode in the second memory area to the first memory area, in response to exiting the power-saving mode.

In an optional implementation, the second memory area includes an area in the buffer that is in a non-power-down state when the memory controller being in the power-saving mode, or a portion of areas in the memory device.

In an optional implementation, the memory controller is further configured to: back up the data related to the host performance boost mode in the first memory area to an area in the buffer that is in a non-power-down state when the memory controller being in the power-saving mode, in the case that the capacity of the area in the buffer that is in the non-power-down state when the memory controller being in the power-saving mode is greater than or equal to capacity required to store the data related to the host performance boost mode; back up the data related to the host performance boost mode in the first memory area to a portion of areas in the memory device, in the case that the capacity of the area in the buffer that is in the non-power-down state when the memory controller being in the power-saving mode is less than the capacity required to store the data related to the host performance boost mode.

In an optional implementation, the memory controller is configured to: compress the data related to the host performance boost mode in the first memory area; store the compressed data related to the host performance boost mode into the second memory area.

In an optional implementation, the memory controller is configured to: decompress the compressed data related to the host performance boost mode stored in the second memory area, in response to exiting the power-saving mode; store the decompressed data related to the host performance boost mode into the first memory area.

In an optional implementation, the memory controller is configured to: generate a data mapping table which includes a mapping relationship between a first address and a second address, wherein the first address is an address of the data related to the host performance boost mode in the first memory area before being backed up to the second memory area, and the second address is an address of the data related to the host performance boost mode in the second memory area after being backed up to the second memory area; acquire the data related to the host performance boost mode stored at the second address in the second memory area, in response to exiting the power-saving mode; restore the data related to the host performance boost mode in the second memory area to the first address in the first memory area according to the data mapping table.

In an optional implementation, the memory controller is configured to: enter the power-saving mode after backing up the data related to the host performance boost mode in the first memory area of the buffer to the second memory area.

In an optional implementation, the data related to the host performance boost mode comprises a list of areas for the host performance boost mode, a list of sub-areas for the host performance boost mode and a bitmap of dirty units.

In an optional implementation, the memory system comprises a memory card or solid state disk or general purpose flash memory.

In the second aspect, the implementations of this disclosure provide a memory controller which comprises a buffer and supports a host performance boost mode, and the memory controller is configured to: back up the data related to the host performance boost mode in the first memory area of the buffer to a second memory area, in response to the memory controller entering the power-saving mode; the first memory area is in a power-down state when the memory controller being in the power-saving mode, and the second memory area is able to retain the data stored in the second memory area when the memory controller is in the power-saving mode; restore the data related to the host performance boost mode in the second memory area to the first memory area, in response to exiting the power-saving mode.

In an optional implementation, the second memory area includes an area in the buffer that is in a non-power-down state when the memory controller being in the power-saving mode, or a portion of areas in the memory device coupled with the memory controller.

In the third aspect, the implementations of this disclosure provide a method for operating a memory system comprises: backing up data related to the host performance boost mode in a first memory area of a buffer in the memory controller to a second memory area, in response to the memory controller entering the power-saving mode; the first memory area is in a power-down state when the memory controller being in the power-saving mode, and the second memory area is able to retain the data stored in the second memory area when the memory controller is in the power-saving mode; restoring the data related to the host performance boost mode in the second memory area to the first memory area, in response to exiting the power-saving mode.

In an optional implementation, the second memory area includes an area in the buffer that is in a non-power-down state when the memory controller being in the power-saving mode, or a portion of areas in the memory device.

In an optional implementation, backing up the data related to the host performance boost mode in the first memory area of the buffer in the memory controller to a second memory area further comprises: back up the data related to the host performance boost mode in the first memory area to an area in the buffer that is in a non-power-down state when the memory controller being in the power-saving mode, in the case that the capacity of the area in the buffer that is in the non-power-down state when the memory controller being in the power-saving mode is greater than or equal to capacity required to store the data related to the host performance boost mode; back up the data related to the host performance boost mode in the first memory area to a portion of areas in the memory device, in the case that the capacity of the area in the buffer that is in the non-power-down state when the memory controller being in the power-saving mode is less than the capacity required to store the data related to the host performance boost mode.

In an optional implementation, backing up the data related to the host performance boost mode in the first memory area of the buffer in the memory controller to a second memory area further comprises: compressing the data related to the host performance boost mode in the first memory area; storing the compressed data related to the host performance boost mode into the second memory area.

In an optional implementation, restoring the data related to the host performance boost mode in the second memory area to the first memory area, in response to exiting the power-saving mode further comprises: decompressing the compressed data related to the host performance boost mode stored in the second memory area, in response to exiting the power-saving mode; storing the decompressed data related to the host performance boost mode into the first memory area.

In an optional implementation, restoring the data related to the host performance boost mode in the second memory area to the first memory area, in response to exiting the power-saving mode further comprises: generating a data mapping table which includes a mapping relationship between a first address and a second address, wherein the first address is an address of the data related to the host performance boost mode in the first memory area before being backed up to the second memory area, and the second address is an address of the data related to the host performance boost mode in the second memory area after being backed up to the second memory area; acquiring data related to the host performance boost mode stored at the second address in the second memory area, in response to exiting the power-saving mode; restoring the data related to the host performance boost mode in the second memory area to the first address in the first memory area according to the data mapping table.

In an optional implementation, the operating method further comprises: the memory controller entering the power-saving mode after backing up the data related to the host performance boost mode in the first memory area of the buffer in the memory controller to the second memory area.

In an optional implementation, the data related to the host performance boost mode comprises a list of areas for the host performance boost mode, a list of sub-areas for the host performance boost mode and a bitmap of dirty units.

In the fourth aspect, the implementations of this disclosure provide a computer-readable storage medium storing a computer program which, when executed, may perform the operating method of any one of above implementations.

In the technical schema provided by the implementations of the present disclosure, the data related to the host performance boost mode in the first memory area of the buffer is backed up to a second memory area, in response to the memory controller entering the power-saving mode; and the second memory area is able to retain the data stored in the second memory area when the memory controller is in the power-saving mode; and the backed data related to the host performance boost mode is restored to the first memory area, in response to exiting the power-saving mode. In a first aspect, the integrity and continuity of the data related to the host performance boost mode before and after power saving is ensured, thus keeping the stability of the performance of the host performance boost mode. In the second aspect, the performance of the memory controller may be improved since the memory controller does not need to re-recommend sub-areas for the host performance boost to the host performance booster after exiting the power saving. In the third aspect, the time consumed to read and write data may be decreased and thus the performance of data reading and writing may be improved.

Features disclosed in several device implementations provided in the present disclosure may be arbitrarily combined to obtain new device implementations without conflict.

Methods disclosed in several method implementations provided in the present disclosure may be arbitrarily combined to obtain new method implementations without conflict.

The foregoing are only implementations of the present disclosure, the protection scope of the present disclosure is not limited thereto. Any variation or replacement readily contemplated by those skilled in the art within the scope of the present disclosure should be covered within the protection scope of the present disclosure. Therefore, the protection scope of this disclosure shall be subject to the protection scope of the claims.

What is claimed is:

1. A memory system, comprising:

a memory device; and a memory controller, which is coupled to the memory device, and includes a buffer that supports a host performance boost mode for communication between the memory device and a host, and the memory controller is configured to:

in response to the memory controller entering a power-saving mode, back up data related to the host performance boost mode in a first memory area of the buffer to a second memory area of the buffer, wherein the first memory area is in a power-down state when the memory controller is in the power-saving mode, the second memory area is to retain the data related to the host performance boost mode stored in the second memory area when the memory controller is in the power-saving mode, and the data related to the host performance boost mode includes a physical address that corresponds to the memory device;

in response to exiting the power-saving mode, restore the data related to the host performance boost mode in the second memory area to the first memory area; and after restoration of the data related to the host performance boost mode to the first memory area, send the data related to the host performance boost mode to the host, wherein the data related to the host performance boost mode includes an indication of validity of the physical address representative of whether data corresponding to the physical address of the memory device is the same as data corresponding to the physical address in the buffer.

2. The memory system of claim 1, wherein the second memory area includes an area that is in a non-power-down state when the memory controller is in the power-saving mode.

3. The memory system of claim 2, wherein, to back up the data related to the host performance boost mode in the first memory area of the buffer to the second memory area of the buffer, the memory controller is further configured to:

in response to a capacity of the second memory area being greater than or equal to a capacity required to store the data related to the host performance boost mode, back up the data related to the host performance boost mode in the first memory area to the second memory area; and in response to the capacity of the second memory area being less than the capacity required to store the data related to the host performance boost mode, back up the data related to the host performance boost mode in the first memory area to areas in the memory device.

4. The memory system of claim 1, wherein, to back up the data related to the host performance boost mode in the first memory area of the buffer to the second memory area of the buffer, the memory controller is further configured to:

compress the data related to the host performance boost mode in the first memory area; and store the compressed data related to the host performance boost mode in the second memory area.

5. The memory system of claim 4, wherein, to restore the data related to the host performance boost mode in the second memory area to the first memory area, the memory controller is further configured to:

in response to exiting the power-saving mode, decompress the compressed data related to the host performance boost mode stored in the second memory area; and store the decompressed data related to the host performance boost mode in the first memory area.

6. The memory system of claim 1, wherein, to restore the data related to the host performance boost mode in the second memory area to the first memory area, the memory controller is configured to:

generate a data mapping table which includes a mapping relationship between a first address and a second address, wherein the first address is an address of the data related to the host performance boost mode in the first memory area before being backed up to the second memory area, and the second address is an address of the data related to the host performance boost mode in the second memory area after being backed up to the second memory area;

in response to exiting the power-saving mode, acquire the data related to the host performance boost mode stored at the second address in the second memory area; and restore the data related to the host performance boost mode in the second memory area to the first address in the first memory area according to the data mapping table.

7. The memory system of claim 1, wherein the memory controller is configured to enter the power-saving mode after backing up the data related to the host performance boost mode in the first memory area of the buffer to the second memory area of the buffer.

8. The memory system of claim 1, wherein the data related to the host performance boost mode comprises: a list of areas for the host performance boost mode, a list of sub-areas for the host performance boost mode, and a bitmap of dirty units, the bitmap of dirty units to include the indication of validity of the data related to the host performance boost mode after exiting the power-saving mode.

9. The memory system of claim 1, wherein the memory system comprises one of a memory card, solid state disk, or general purpose flash memory.

10. A method for operating a memory system, comprising:

in response to a memory controller entering a power-saving mode, backing up data related to a host performance boost mode in a first memory area of a buffer in the memory controller to a second memory area of the buffer, the host performance boost mode including data for communication between a memory device of the memory system and a host, wherein the first memory area is in a power-down state when the memory controller is in the power-saving mode, the second memory area is to retain the data stored in the second memory area when the memory controller is in the power-saving mode, and the data related to the host performance boost mode includes a physical address that corresponds to the memory device;

in response to exiting the power-saving mode, restoring the data related to the host performance boost mode in the second memory area to the first memory area; and after restoration of the data related to the host performance boost mode to the first memory area, sending the data related to the host performance boost mode to the host, wherein the data related to the host performance boost mode includes an indication of validity of the physical address representative of whether data corresponding to the physical address of the memory device is the same as data corresponding to the physical address in the buffer.

11. The method of claim 10, wherein the second memory area includes an area that is in a non-power-down state when the memory controller is in the power-saving mode.

12. The method of claim 11, wherein backing up the data related to the host performance boost mode in the first memory area of the buffer in the memory controller to the second memory area of the buffer comprises:

in response to a capacity of the second memory area being greater than or equal to a capacity required to store the data related to the host performance boost mode, backing up the data related to the host performance boost mode in the first memory area to the area in the second memory area; and in response to the capacity of the second memory area being less than the capacity required to store the data related to the host performance boost mode, backing up the data related to the host performance boost mode in the first memory area to areas in the memory device.

13. The method of claim 10, wherein backing up the data related to the host performance boost mode in the first memory area of the buffer in the memory controller to the second memory area of the buffer comprises:

compressing the data related to the host performance boost mode in the first memory area; and storing the compressed data related to the host performance boost mode in the second memory area.

14. The method of claim 13, wherein restoring the data related to the host performance boost mode in the second memory area to the first memory area comprises:

in response to exiting the power-saving mode, decompressing the compressed data related to the host performance boost mode stored in the second memory area; and storing the decompressed data related to the host performance boost mode in the first memory area.

15. The method of claim 10, wherein restoring the data related to the host performance boost mode in the second memory area to the first memory area comprises:

generating a data mapping table which includes a mapping relationship between a first address and a second address, wherein the first address is an address of the data related to the host performance boost mode in the first memory area before being backed up to the second memory area, and the second address is an address of the data related to the host performance boost mode in the second memory area after being backed up to the second memory area;

in response to exiting the power-saving mode, acquiring the data related to the host performance boost mode stored at the second address in the second memory area; and restoring the data related to the host performance boost mode in the second memory area to the first address in the first memory area according to the data mapping table.

16. The method of claim 10, further comprising entering, by the memory controller, the power-saving mode after backing up the data related to the host performance boost mode in the first memory area of the buffer in the memory controller to the second memory area of the buffer.

17. The method of claim 10, wherein the data related to the host performance boost mode comprises: a list of areas for the host performance boost mode, a list of sub-areas for the host performance boost mode, and a bitmap of dirty units, the bitmap of dirty units to include the indication of validity of the data related to the host performance boost mode after exiting the power-saving mode.

18. A non-transitory computer-readable storage medium storing a computer program which, when executed, performs a method for operating a memory system, the method comprises:

in response to a memory controller entering a power-saving mode, backing up data related to a host performance boost mode in a first memory area of a buffer in the memory controller to a second memory area of the buffer, the host performance boost mode including data for communication between a memory device of the memory system and a host, wherein the first memory area is in a power-down state when the memory controller is in the power-saving mode, the second memory area is to retain the data stored in the second memory area when the memory controller is in the power-saving mode, and the data related to the host performance boost mode includes a physical address that corresponds to the memory device;

in response to exiting the power-saving mode, restoring the data related to the host performance boost mode in the second memory area to the first memory area; and after restoration of the data related to the host performance boost mode to the first memory area, sending the data related to the host performance boost mode to the host, wherein the data related to the host performance boost mode includes an indication of validity of the physical address representative of whether data corresponding to the physical address of the memory device is the same as data corresponding to the physical address in the buffer.

19. The non-transitory computer-readable storage medium of claim 18, wherein backing up the data related to the host performance boost mode in the first memory area of the buffer to the second memory area of the buffer further comprises:

in response to a capacity of the second memory area being greater than or equal to a capacity required to store the data related to the host performance boost mode, backing up the data related to the host performance boost mode in the first memory area to the second memory area, wherein the second memory area is in a non-power-down state when the memory controller is in the power-saving mode; and in response to the capacity of the area of the second memory area being less than the capacity required to store the data related to the host performance boost mode, backing up the data related to the host performance boost mode in the first memory area to areas in the memory device.

20. The non-transitory computer-readable storage medium of claim 18, wherein backing up the data related to the host performance boost mode in the first memory area of the buffer to the second memory area of the buffer further comprises:

compressing the data related to the host performance boost mode in the first memory area; and storing the compressed data related to the host performance boost mode in the second memory area.

* * * * *